May 8, 1951 W. S. MORTLEY 2,551,809

PIEZOELECTRIC CRYSTAL CIRCUIT ARRANGEMENT

Filed Aug. 21, 1947

INVENTOR
Wilfrid Sinden Mortley
BY
Charles H. Brown
ATTORNEY

Patented May 8, 1951

2,551,809

UNITED STATES PATENT OFFICE 2,551,809

PIEZOELECTRIC CRYSTAL CIRCUIT ARRANGEMENT

Wilfrid Sinden Mortley, Great Baddow, Chelmsford, England, assignor to Marconi's Wireless Telegraph Company Limited, London, England, a company of Great Britain Application August 21, 1947, Serial No. 769,831
In Great Britain July 23, 1946

Section 1, Public Law 690, August 8, 1946
Patent expires July 23, 1966

6 Claims. (Cl. 178—44)

This invention relates to piezo-electric crystal circuit arrangements and has for its object to provide improved piezo-electrically controlled circuit arrangements in which the controlled frequency can be modulated or otherwise varied within limits.

The most important application of the invention is to crystal controlled frequency modulated oscillators but, as will be seen later, the invention may be employed whenever a variable crystal controlled frequency is required.

There are several known circuit arrangements in which frequency modulation of a crystal controlled oscillator may be effected by varying the value of a susceptance which is provided by a device or circuit suitably associated with or included in the crystal circuit, the said susceptance being, in practice, usually provided by a suitably connected and operated thermionic tube e. g. a tube arranged to act as a variable capacity by Miller effect. The present invention seeks to provide improved and simple arrangements whereby deviations in frequency of several parts in a thousand may be obtained without introducing prohibitive amplitude modulation or distortion, good proportionality being maintained between applied susceptance variation and frequency deviation.

According to this invention a piezo-electric crystal to be employed in conjunction with a device or circuit providing variable susceptance for producing a variable or modulation frequency, is associated with said device or circuit through a line a quarter, or an odd multiple of a quarter of a wave length long, or through an equivalent impedance inverting network or device.

The invention is illustrated in and further explained in connection with the accompanying drawings.

Figure 1:
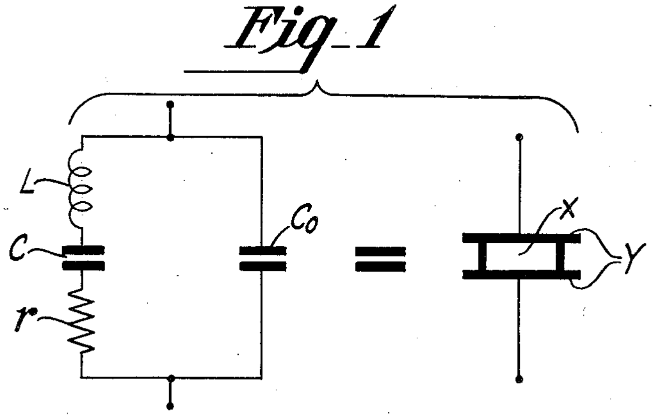

In order that the invention may be the better understood, first consider the equivalent circuit of a piezo-electric crystal and, for simplicity, assume the crystal electrodes to be in the common form of conductive films deposited directly on the crystal faces. This assumption has the simplifying advantage that there are no capacities between the crystal electrodes and the crystal faces to be considered. It is, of course, to be understood that the invention is not limited to the use of this particular electrode arrangement, and that crystals with separate electrodes may be employed. For such a case, however, the explanation which follows would have to be modified by taking into consideration the electrode crystal face capacity. The equivalent circuit of a crystal X with electrodes Y in the form of deposits directly on the crystal faces is as shown in Fig. 1 and consists of two parallel branches, one consisting of the electrical equivalents of mechanical resonance—this branch consists of an inductance L, a capacity C and a resistance $r$ in series—and the other consisting of a capacity $C_0$ equal to the capacity between the crystal faces. It will be clear that if this last capacity is neutralised there will be a substantially linear relationship between the series resonant frequency of the circuit and any reactance connected in series with it. If, therefore, the equivalent crystal impedance is inverted so as to make it appear as that of a parallel tuned circuit a substantially linear relationship will exist between frequency and a variable susceptance connected with the circuit. This is achieved, in accordance with the invention, by associating the crystal with the said variable susceptance via a line a quarter or an odd multiple of a quarter of a wave length long or through an equivalent circuit or device.

Figure 2:
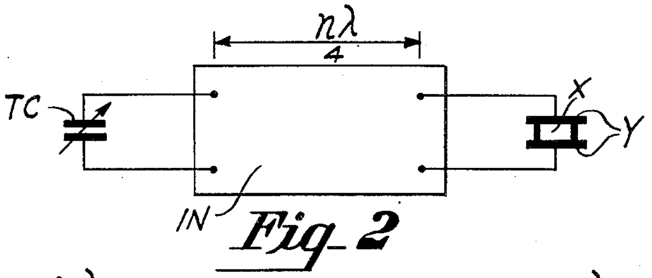

Fig. 2 illustrates, in block diagram form, the essential circuit of the invention. In Fig. 2 X represents the crystal with its electrodes Y, and TC represents the means providing the variable susceptance. For the sake of simplicity TC is shown as a variable condenser but it might be a variable inductance, or, more probably in practice, a valve circuit such for example as a so-called Miller circuit, connected and operated to act as an electronic variable susceptance device. The device or circuit TC is connected to the crystal electrodes through a device or circuit IN of electrical length $$\frac{n\lambda}{4}$$

where $\lambda$ is the wave length and $n$ is an odd number, preferably unity. It will be apparent to those skilled in the art that the capacity across the crystal ($C_0$ in Fig. 1) is between the terminals on the crystal side of the device or circuit IN and accordingly, in designing said device or circuit IN, this capacity should be reckoned as part thereof.

Figure 3:
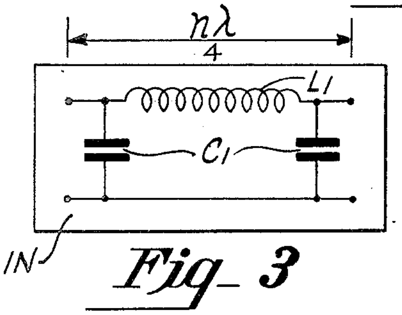

The device or circuit IN may take any of a variety of different forms. For example it may consist, as shown in Fig. 3, of a so-called $\pi$ section network as well known per se and comprising an inductance of value $L_1$, and two equal capacities $C_1$. The inductance and condensers are dimensioned in accordance with well known principles to satisfy the expression $\omega^2 L_1 C_1 = 1$ to constitute a single section quarter wave line at the intended mean frequency $\omega$ (in circular measure). As already made clear, the capacity $C_1$ on the crystal side of the network includes the capacity ($C_0$) between the faces of the crystal, so that the quarter wave line will invert only the impedance of that part of the equivalent crystal circuit (see Fig. 1) which corresponds to the components of mechanical resonance. In the case of a crystal with electrodes spaced therefrom the same technique may be used if the capacities between electrodes and crystal faces are balanced by an equal amount of series inductance reactance. By connecting a linearly variable susceptance device of any known suitable form to the terminals remote from the crystal—the variable susceptance provided may be either capacitive or inductive, positive or negative—the resonant frequency may be varied substantially linearly e. g., for frequency modulation. Oscillation may, of course, be maintained by also connecting a suitable negative resistance in parallel.

In practice the inductance $L_1$ will also present some ohmic resistance which may be represented as a series resistance. It may be shown that the effect of this is to introduce, in parallel with the terminals, a loss resistance which becomes a maximum when $C_1$ is reduced to zero. It is therefore sometimes preferable to choose the frequency corresponding to this as the centre frequency (about which modulation or variation is effected) rather than the series resonant frequency of the crystal. If this be done the loss resistance introduced will be approximately inversely proportional to the square of the frequency deviation. This will tend to produce amplitude modulation at twice the modulation frequency. In some cases it may be necessary or desirable to eliminate such amplitude modulation by known means e. g. by amplitude limiters or automatic gain control in a convenient associated circuit.

It may be noted that the expression $\omega^2 L_1 C_1 = 1$ can be satisfied only for one frequency but errors introduced from this cause are negligible if the frequency deviation does not exceed a few parts in a thousand.

Figure 4:
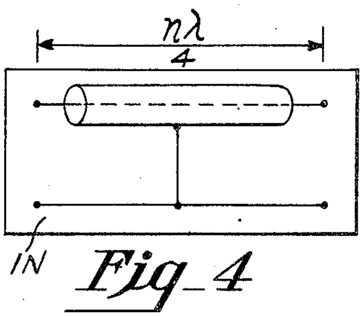

Fig. 4 shows another form which may be adopted for the impedance inverter IN of Fig. 2; namely that of a line with an inductance equal to $$\frac{1}{\omega^2 C_0}$$

across the crystal approximately to balance $C_0$. In Fig. 4 which is practically self-explanatory a concentric line is shown but other forms may be used.

Figure 5:
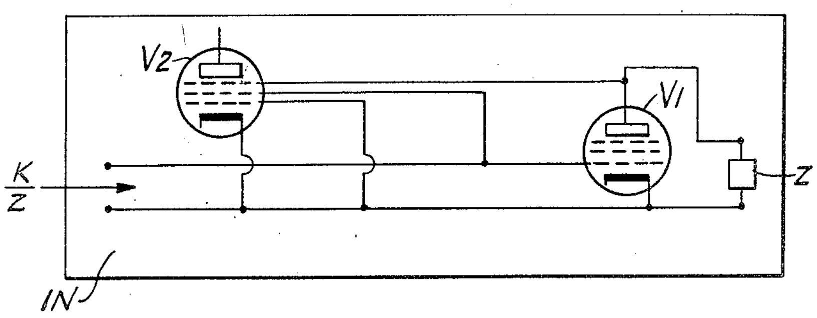

In Fig. 5 the impedance inverter IN of Fig. 3 is constituted by a two valve circuit comprising two pentodes $V_1$, $V_2$ of which at least $V_2$ must be a valve giving good control of the electron stream by the suppressor grid. As will be seen in Fig. 5, the suppressor grid of $V_2$ is connected to the anode of $V_1$ while the screen grid of $V_2$ is connected to the control grid of $V_1$, the control grid of $V_2$ being connected to the common cathode point. As in Figures 3 and 4, the crystal is connected across the right hand terminals in Fig. 5, i. e. across the anode-cathode space of $V_1$ while the device TC is connected across the left hand terminals of Fig. 5 or negative resistance means provided for the maintenance of oscillation may be made suitably frequency selective. In the former case an impedance Z looking in at the right hand terminals appears (to a close degree of approximation) as $$\frac{K}{Z}$$

looking in at the left hand terminals, K being a constant. In other words the circuit is, to a practically close degree of approximation, an impedance inverter.

In the above described circuits there will be a tendency to oscillation at a pole frequency other than the intended frequency. To avoid such undesired oscillation a resistor, in series with a parallel tuned circuit resonant at the crystal midfrequency, may be connected across the terminals. The resistor is adjusted to impose maximum load at the undesired pole frequency while imposing only a small load at the intended frequency.

Having now particularly described and ascertained the nature of my said invention and in what manner the same is to be performed, I declare that what I claim is:

1. A piezo-electric crystal arrangement, comprising a frequency-controlling piezo-electric crystal, variable susceptance means coupled to said crystal, and an impedance network having impedance values such as to constitute a quarter wave line at a pre-determined mean operating frequency of said crystal, said network being connected between said variable susceptance means and said crystal.

2. A piezo-electric crystal arrangement, comprising a frequency-controlling piezo-electric crystal, variable susceptance means coupled to said crystal, and an impedance network having series inductance and shunt capacitance such as to satisfy the following relation:

$$\omega^2 LC = 1$$

where $\omega$ represents a pre-determined mean operating frequency of said crystal, L symbolizes said series inductance, and C symbolizes said shunt capacitance, said network being connected between said variable susceptance means and said crystal.

3. A piezo-electric crystal arrangement, comprising a frequency-controlling piezo-electric crystal, variable susceptance means coupled to said crystal, and a transmission line substantially an odd multiple of a quarter wave-length long at a pre-determined mean operating frequency of said crystal, said line being connnected between said variable susceptance means and said crystal.

4. A piezo-electric crystal arrangement, comprising a frequency-controlling piezo-electric crystal, variable susceptance means coupled to said crystal, and a transmission line substantially an odd multiple of a quarter wave-length long at a pre-determined mean operating frequency of said crystal, said line having an inductance equal to $$\frac{1}{\omega^2 C_0}$$

where $\omega$ represents said mean operating frequency and $C_0$ symbolizes the interface capacitance of said crystal, said line being connected between said variable susceptance means and said crystal.

5. A piezo-electric crystal arrangement, comprising a frequency-controlling piezo-electric crystal, variable susceptance means coupled to said crystal, and an impedance inverting circuit connected between said means and said crystal, said circuit acting to invert the equivalent impedance of said crystal.

6. A piezoelectric crystal arrangement comprising a piezoelectric crystal, variable susceptance means coupled to said crystal, and an impedance inverting circuit in the coupling between said means and said crystal, said circuit having two terminals at each end thereof for connection at one end to said means and at the other end to said crystal, a pair of pentodes, means connnecting the cathodes of both pentodes and the control grid of one pentode to one terminal at each end of the circuit, means connecting the screen grid of said one pentode and the control grid of the other pentode to the remaining terminal at one end of the circuit, and means connecting the anode of said other pentode and the suppressor grid of said one pentode to the remaining terminal at the other end of the circuit.

WILFRID SINDEN MORTLEY.

REFERENCES CITED

The following references are of record in the file of this patent:

UNITED STATES PATENTS

| Number | Name | Date |
|---|---|---|
| 2,029,488 | Koch | Feb. 4, 1936 |
| 2,128,837 | Meahl | Aug. 30, 1938 |
| 2,274,347 | Rust et al. | Feb. 24, 1942 |
| 2,424,246 | Mason | July 22, 1947 |